UNITED STATES PATENT OFFICE.

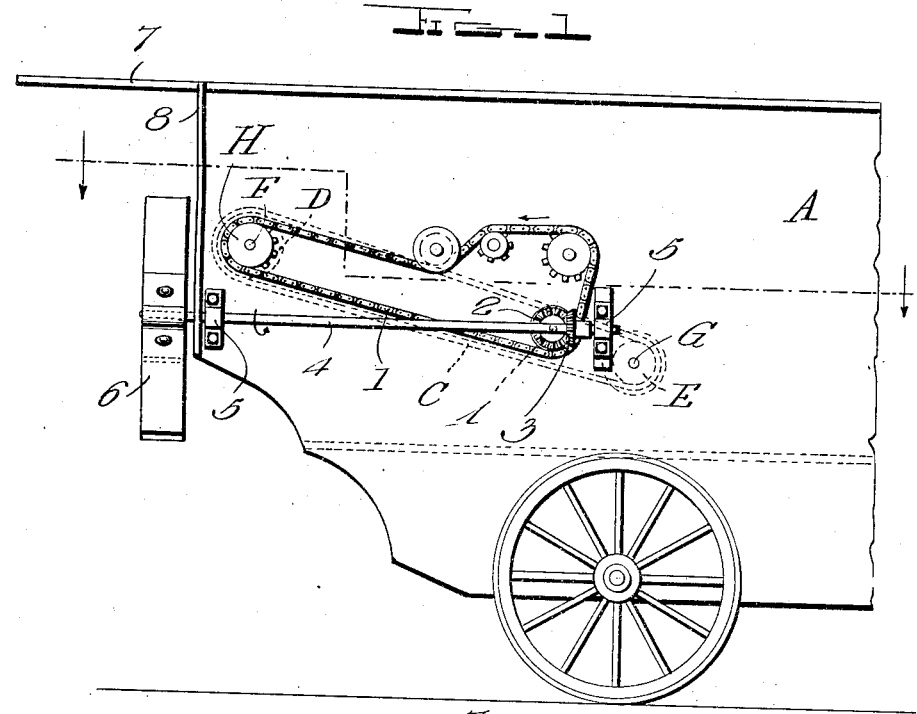
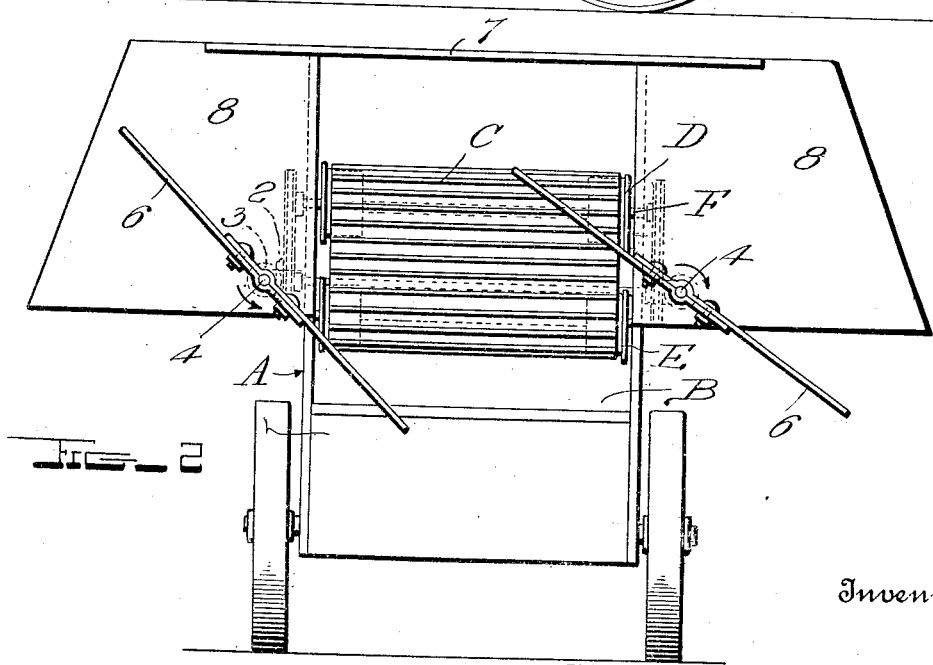

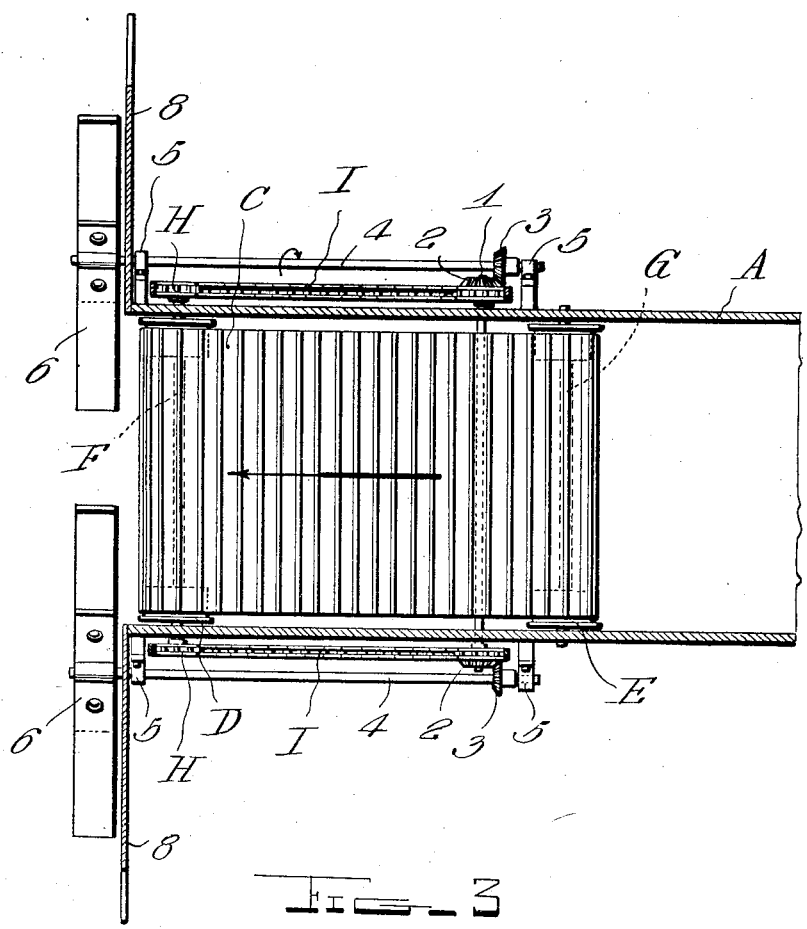

SHERMAN A. HARN, OF WATERVILLE, WASHINGTON.

STRAW-SPREADING ATTACHMENT.

1,349,152.  Specification of Letters Patent.  Patented Aug. 10, 1920.

Application filed March 15, 1920. Serial No. 365,847.

*To all whom it may concern:*

Be it known that I, SHERMAN A. HARN, a citizen of the United States, residing at Waterville, in the county of Douglas and State of Washington, have invented certain new and useful Improvements in Straw-Spreading Attachments; and I do declare the following to be a full, clear and exact description of the invention, such as will enable others skilled in the art to which it appertains to make and use the same.

This invention relates to a straw spreading attachment for combined harvester and thresher.

The main object of this invention is to provide a combined harvester and thresher with an improved means of disposing of the straw (thereby eliminating the usual waste of time and material in subsequently storing or spreading the straw,) and immediately scattering it for sheltering the ground after the shelter of the ground has been destroyed by the harvester cutting the straw from the ground, thus restoring and distributing a fertilizing agency to the harvested ground.

Another object of this invention is to provide an improved straw-distributing attachment that can be quickly and easily attached to a combined harvester and thresher of previously known construction without detrimentally affecting the construction or operation of the machine.

Other objects and advantages will be pointed out or implied in the following details of description in connection with the accompanying drawings, in which;

Figure 1 is a side elevation of the rear portion of a combined harvester and thresher having my improved straw-spreading attachment secured thereto.

Fig. 2 is a rear end elevation of the combined harvester and thresher having my improved straw-spreader attachment secured thereto.

Fig. 3 is a horizontal sectional view, the section being taken substantially along the lines 3—3 of Fig. 1.

Referring to these drawings in detail, in which similar reference characters correspond with similar parts in the several views, and in which the combined thresher and harvester, exclusive of my invention, is of ordinary construction, the invention consists in the construction and arrangement of parts which will now be specifically described and claimed as follows:

The vehicle which carries the machinery of the combined harvester, thresher and straw-spreader is generally indicated by the numeral A the same being provided with ground wheels which enable it to be easily drawn along upon the surface of the ground which is to be harvested. The rear end of this vehicle is open as indicated at B, and an endless conveyer or belt-conveyer C is carried by two sets of drums or pulleys D and E, these sets or pairs of pulleys being carried respectively by shafts F and G. The sprocket wheel H is mounted on the outer end portion of shaft F, and a sprocket chain I is in mesh with the sprocket wheel H, this sprocket chain being driven by any appropriate means, such as illustrated, although not specifically described.

The structure thus far illustrated is well known to persons familiar with the art, and the endless conveyer C is known by the term "rattle rake," this being the device which separates the grain from the straw while conveying the straw to the rear end and through the opening at the rear end of the combined harvester and thresher.

Previous to this present invention the straw has been permitted to form a wind row in the path over which the machine has traveled in harvesting the grain, and subsequently, when it has been desired to plow or till this piece of ground, it has been necessary to either burn the wind row of straw or to scatter it by hand or otherwise, thus involving a great waste of straw, or a great waste of time and energy in scattering the straw. Moreover, the ground, except where it has been covered by the wind row, has been left bare or comparatively bare, so that the rays of the sun have their full force in baking the ground and parching any grass or other young vegetation which might have been present.

The present invention eliminates the above described waste and expense by scattering or spreading the straw immediately after the grain has been separated therefrom.

My improved straw spreader or straw spreading attachment comprises a shaft 1 which extends laterally through the frame or body of the combined harvester and thresher, a pair of beveled gear wheels 2 which are secured on the outer end portion of shaft 1, a pair of beveled gear wheels 3 in mesh with the beveled gear wheels 2, respectively, a pair of parallel and substantially horizontal shafts 4 which extend forwardly and rearwardly of the vehicle, the latter being provided with bearings 5 which support these shafts and permit them to rotate, and at least two pairs of paddles or fans 6 which are secured on the front end of the shaft 4 and extend in rear of the conveyer C and rotate in opposite directions with their respective shafts 4. In other words, the inner paddles 6 move upward and outward at the discharge end of the conveyer, so that when the straw falls from the conveyer, the paddles catch the straw and carry it upward and outward, also creating a current of air in this same direction, so that the straw which is not actually caught by the paddles will be carried by this air current. The paddles of each shaft 4 have their main surfaces preferably lying in the plane of the axis of its shaft 4 so that the straw will not be thrown forward or rearward, but laterally of the path of the machine.

The invention comprises the combination of the elements 1 to 6 with the previously described elements A to H, and it also comprises a horizontal deflector plate 7 and two vertical deflector plates 8. These deflector plates 7 and 8 coöperate with one another for preventing the wind from blowing the straw forward upon the forward portion of the machine, in other words, they coöperate with paddles 6 for directing the straw in paths at right angles to the path of travel of the machine.

It is to be understood that all of the elements which are visible in full lines in Fig. 1 are duplicated on the opposite side of the machine.

Although I have described this embodiment of my machine very specifically, it is not intended to limit this invention to these exact details of construction and arrangement, but changes may be made within the scope of the inventive ideas as implied and claimed.

What I claim as my invention is:

A spreading attachment for a thresher or like machine which includes a vehicle having an open rear end, a belt-conveyer having its discharge end at said open rear end, and a rotary shaft on which said belt-conveyer is supported; this spreading attachment comprising a sprocket wheel attachable to said shaft at a point exteriorly of said vehicle, a driven shaft, a sprocket wheel carried by said driven shaft, a chain to transmit motion from the first said sprocket wheel to the second said sprocket wheel for rotating said driven shaft, a pair of shafts adapted to be journaled on opposite sides of the vehicle and to extend to said open rear end from said driven shaft, paddles on the rear ends of said pair of shafts, gear wheels on the front end portions of the paddle-carrying shafts, and gear wheels on the end portions of said driven shaft and meshing with the gear wheels of said paddle-carrying shafts respectively, whereby straw or material from said belt-conveyer can be spread in and laterally of the path of the harvester or like machine.

In testimony whereof I have hereunto set my hand.

SHERMAN A. HARN.